June 28, 1927.

J. H. JACOBS

EDUCATIONAL TOY

Filed Aug. 9, 1926

Joseph H. Jacobs,
INVENTOR

BY Victor J. Evans
ATTORNEY

WITNESS:

June 28, 1927.

J. H. JACOBS

EDUCATIONAL TOY

Filed Aug. 9, 1926

Joseph H. Jacobs,
INVENTOR

BY Victor J. Evans
ATTORNEY

WITNESS:
P. H. Hickey.

Patented June 28, 1927.

1,634,194

UNITED STATES PATENT OFFICE.

JOSEPH H. JACOBS, OF PAXTON, MONTANA.

EDUCATIONAL TOY.

Application filed August 9, 1926. Serial No. 128,217.

My present invention has reference to an educational toy, and is primarily designed for developing a child's conception of numerals but which is also of a type to attract interest and afford amusement to the players thereof.

An object is the provision of a toy for teaching children to more rapidly read and calculate figures and to strengthen the child's concentration; which toy includes two intermeshing cogged wheels, each of which is free to rotate on its axis and each of which is, in a line with the cogs thereon, inscribed with numerals chosen at random, the discs being arranged in a suitable casing having a sight opening through which two of the aligning figures on the cog wheels are displayed, there being means for imparting an irregular motion to the discs to allow each set of numerals thereon to momentarily remain stationary at the sight opening before being replaced by the following numerals on the discs, while means, operable by either of the players of the toy is provided for stopping the turning of the discs when chosen aligning numerals are to be held in display position.

A further object is the provision of an educational toy which may be operated in various ways and which is designed to be played with by two children, one of which operates means for imparting an irregular movement to a pair of intermeshing revoluble members, each having on its face numerals arranged at random and so placed that the registering numerals on both of the members will be brought to display position at the same time, one of said members bearing at least one more numeral than the other member to permit of a greater variety of number combinations appearing in display position, the operating means being such as to impart an irregular movement to the members so that the aligning numerals on said members will be momentarily halted in display position, means being provided for preventing the free rotation of the members, the device also including means operable by either of the players for holding the revoluble members from turning when desired numerals thereon are brought to display position.

To the attainment of the above broadly stated objects and others which will present themselves as the nature of the invention is better understood, the improvement resides in certain novel features of construction, combination and operative association of parts, a satisfactory embodiment of which is disclosed by the accompanying drawings.

Figure 1:
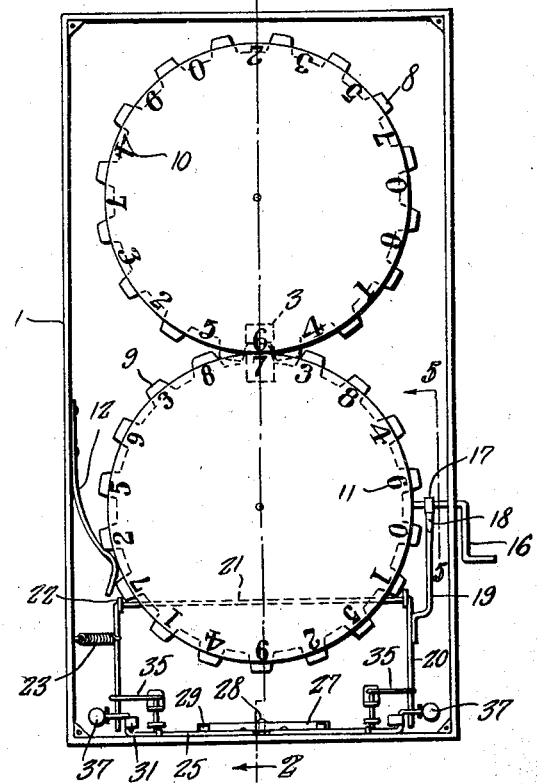
Figure 1 is a top plan view of my improved educational toy, the cap or cover being removed.
Figure 2:
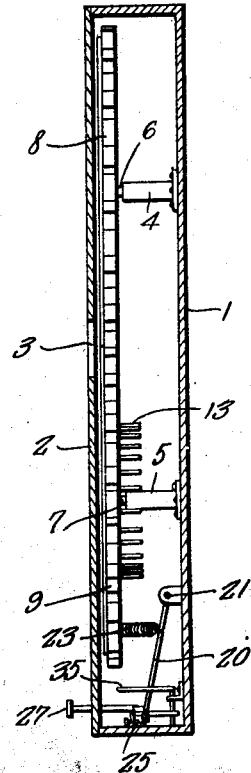
Figure 2 is a sectional view approximately on the line 2—2 of Figure 1.
Figure 3:
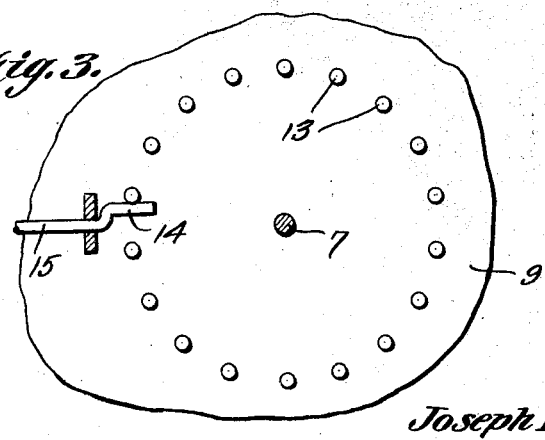
Figure 3 is a fragmentary plan view looking toward the inner face of the disc provided with the pin wheel and also showing the crank end of the operating handle for the wheel, the support through which the handle is journaled being in section.
Figure 4:
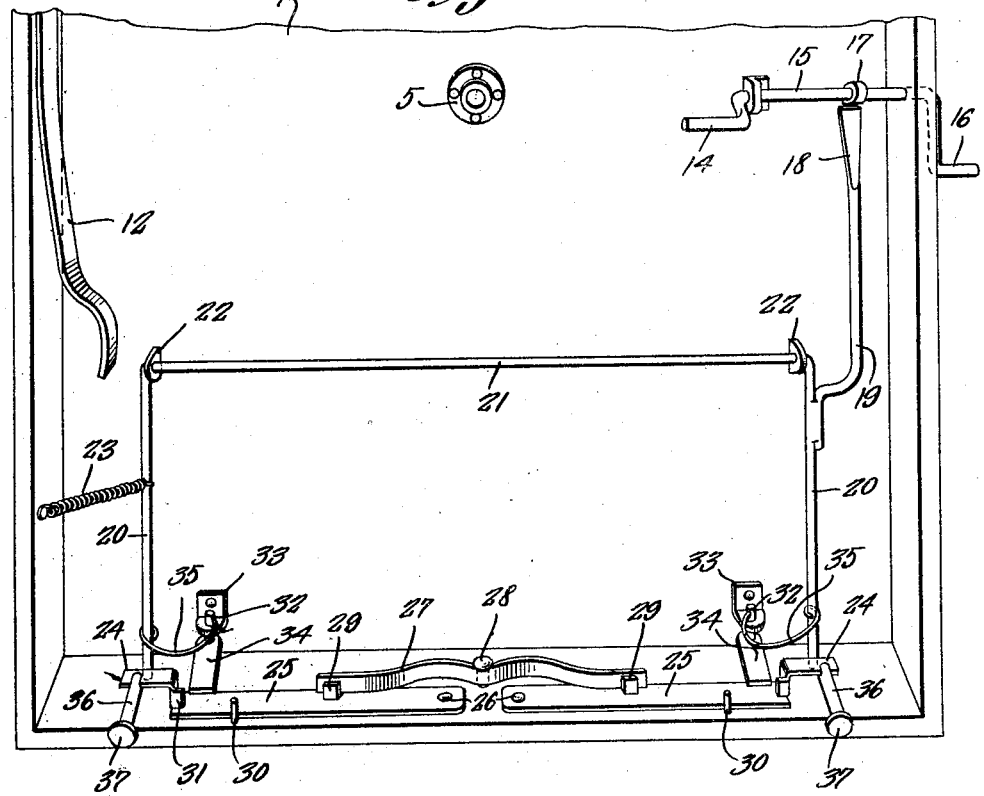
Figure 4 is a perspective view looking toward the lower portion of the casing, with the lower disc removed.
Figure 5:
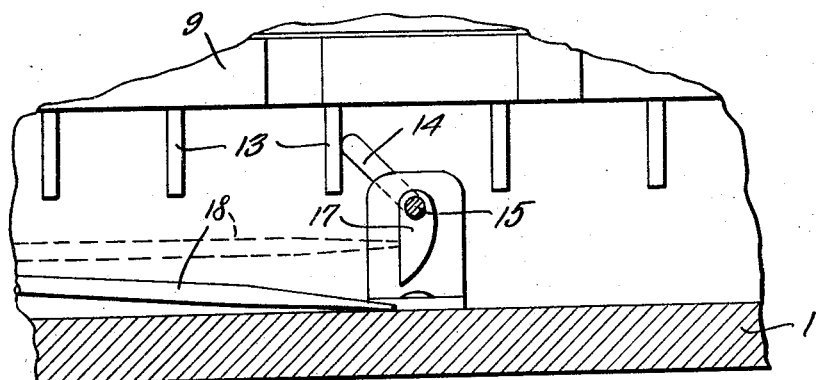
Figure 5 is a sectional view on an enlarged scale, approximately on the line 5—5 of Figure 1.

In the embodiment of the invention as disclosed by the drawings, I make use of a substantially rectangular casing 1. This casing is provided with a removable cover plate 2, and the cover plate has a central sight opening 3 therethrough. The rear or back of the casing 1 has secured on the inner face thereof bearings 4 and 5, arranged centrally with respect to the casing and spaced from each other. In the bearings 4 and 5 there are journaled short shafts or trunnions 6 and 7 which are fixed on the inner faces of cogged wheels 8 and 9, respectively. One of these cogged wheels has at least one more tooth than the other, and the said cog wheels, preferably in a line with the teeth thereon, have their outer faces inscribed with numerals 10 and 11 respectively. These numerals are arranged at random, that is, the numbers are not consecutively disposed. On one side of the casing 1 there is fixed one end of an arched spring 12, and the outer rounded end of this spring is designed to engage with the periphery of the cog wheel 9 and thus serve as a retarding element for preventing the free rotation of said cog wheel. The cog wheels are so arranged in the casing that the aligning numerals on each of the said wheels will be disposed opposite the sight opening 3.

The inner face of the cog wheel 9 is provided with a pin wheel 13, and the pins of this wheel are adapted to be successively contacted by the cranked end 14 of a shaft 15 that is journaled in suitable bearings and also journaled in a bearing opening in one side of the casing. The outer end of the shaft is cranked to provide the same with an operating handle 16. The pins of the wheel 13 are so spaced that the turning of the handle 16 will cause the cranked end 14 on the shaft thereof to impart an intermittent motion to the cog wheel 9 and a like motion to the cog wheel 8. By this arrangement the aligning numerals on the cog wheels will be momentarily halted as they appear opposite the sight opening 3. Also by providing one of the cog wheels with at least one more tooth than the other a greater variety of number combinations will be made to appear opposite the sight opening. The toy may be employed for instructing the children in addition or subtraction or the same may be employed as a game and will teach them to more rapidly read and calculate numerals as well as to strengthen their concentration. In Figure 1 of the drawings the numeral 7 on the disc 11 is arranged below the numeral 6 on the disc 10 and these numerals are to be added by the users of the toy. The toy is also in the nature of a game, in which instance, numerals on both of the discs which sum up a total or similar numerals on each disc are chosen by each of the players. One of the players turns the handle 16 to revolve the disc and the child or persons whose combined numbers first appear through the sight opening scores the greatest number of points. Of course, the same combination or numerals may be chosen by both players, and as the child who first sees the combination can appropriate the same the game will be enlivened and the child's concentration will be strengthened by the provision of means for stopping the turning of the discs when the desired or chosen numerals are in display position. A number of different means may be successfully employed for obtaining this result, but as illustrated in the embodiment of the improvement I have shown the shaft 15 provided with a cam or lug 17 which is in the path of contact with a stop finger 18. The finer is formed on one end of a rod 19 that is secured to one of the parallel arms 20 of a substantially U-shaped member or rod. The connecting element 21 for the arms 20 of the U-shaped member is journaled in suitable bearings 22 fixed on the rear wall of the casing. The arms 20 of the U-shaped member are influenced in an outward direction through the casing through the medium of a spring 23 to bring the same into contacting engagement with the offset lugs 24 formed on the ends of plates 25 which are pivoted, as at 26, to the bottom wall of the casing 1. Each plate 25 is contacted by the respective ends of an arched spring 27 which is centrally secured or supported by means 28 on the base of the casing 1. Preferably, the arched arms of the springs 28 contact with lugs 29 on the said plates 25 and the outward movement of these plates 25 is limited by pins 30 which are partly let in the base or bottom wall of the casing 1. The lugs 24 have their inner and offset ends formed with inwardly directed flanges 31 and having their pivots 32 passing through bearing brackets 33 on the back wall of the casing 1 there are short plates in the nature of dogs 34. The pivots 32 project laterally from the dogs 34, the lower portions of the pivots finding a bearing in the bottom wall of the casing 1 while the upper or outer ends of the pivots which project above the horizontal flanges of the angle brackets 33 have each secured thereto a light curved wire or similar spring element 35. The ends of each of the elements 35 are connected to the respective arms 20 of the U-shaped or yoke member 21. Each lug 24 has an outwardly extending rod or arm 36 thereon that passes through suitable openings in the face plate, and the outer ends of these rods are provided with heads 37.

Normally the spring 23 influences the yoke so that the stop finger 18 carried thereby is out of engagement with the cam or lug 17 on the shaft 15. When the desired aligning numerals on the discs are brought opposite the display opening 3, one of the players presses the head or button 37 which will swing the yoke to bring the stop finger 18 thereof into engagement with the cam or lug 17, and thus prevent the turning of the shaft and consequently the turning of the discs. The second player cannot move his head or button 37 for the reason that the swinging of the yoke will exert a pull upon the element 35 to cause the latter to swing the dog 34 to bring the same into engagement with the stop flange 31 on the plate 25, and in this manner no dispute as to the player entitled to the score can arise. Normally the dogs 34 have their outer ends arranged only a slight distance away from the outer edges of the stop flanges 31, so that one of these elements will glide along the edge of the dog when pressure is exerted upon the button end of the rod or arm to which the said stop element is connected, and the swinging of the second arm of the substantially U-shaped member will permit of the light spring or link connection between the said arm and the pivot of the second arm to swing the last mentioned dog to the rear of the stop flange 31, which, of course, prevents the movement of the second rod 38 but the said light spring 35 will not interfere with the movement of the said arm by the U-shaped member. The springs are of sufficient strength to return the dogs 34 to initial position when pressure is released from either of the elements 37.

If, however, both buttons are pressed at the same time a tie is considered. Many other mathematical games may be also played by the toy, all tending to develop sense and knowledge of the different combinations of figures, as well as the quick perception and rapid calculation thereof.

The improvement is, of course, susceptible of changes and modifications, and therefore I do not wish to be limited to the precise details of construction herein set forth and hold myself entitled to such changes therefrom as fairly fall within the scope of what I claim.

Having described the invention, I claim:—

1. In a mathematical toy, a casing having a sight opening, intermeshing toothed discs in the casing, one of said discs having a greater number of teeth than the other and both of said discs having figures inscribed on the outer face thereof, and the aligning figures on the respective discs arranged to be displayed through the sight opening, a pin wheel on one of the discs, a shaft having a cranked end for engaging the pins of the disc, an operating handle for the shaft and means operable to engage the shaft to hold the same from turning.

2. In a mathematical toy, a casing having a sight opening, intermeshing toothed discs in the casing, one of said discs having a greater number of teeth than the other and both of said discs having figures inscribed on the outer face thereof, and the aligning figures on the respective discs arranged to be displayed through the sight opening, a pin wheel on one of the discs, a shaft having a cranked end for engaging the pins of the disc, an operating handle for the shaft, a cam lug on the shaft, a finger opposite the lug, spring influenced means holding the finger out of contact with the lug and headed elements movable to influence the finger to engage with the lug to stop the turning of the shaft.

3. In a mathematical toy, a casing having a sight opening, intermeshing toothed discs in the casing, one of said discs having a greater number of teeth than the other and both of said discs having figures inscribed on the outer face thereof, and the aligning figures on the respective discs arranged to be displayed through the sight opening, a pin wheel on one of the discs, a shaft having a cranked end for engaging the pins of the disc, an operating handle for the shaft, a cam lug on the shaft, a finger opposite the lug, spring influenced means holding the finger out of contact with the lug, headed elements movable to influence the finger to engage with the lug to stop the turning of the shaft and means for rendering one of said headed elements inoperative when the other has been actuated to influence the finger.

4. In a mathematical toy, a casing having a sight opening, intermeshing toothed discs in the casing, one of said discs having a greater number of teeth than the other and both of said discs having figures inscribed on the outer face thereof, and the aligning figures on the respective discs arranged to be displayed through the sight opening, a pin wheel on one of the discs, a shaft having a cranked end for engaging the pins of the disc, an operating handle for the shaft, a cam lug on the shaft, a spring influenced yoke hingedly supported in the casing, a finger carried by one of the arms thereof and disposed opposite the cam member, spring means influencing the yoke in one direction to bring the finger out of contact with the cam, a pair of pivotally supported plates, spring means influencing the plates in one direction, a lug on the outer end of each plate disposed opposite the arms of the yoke, a headed operating element for each lug, an inwardly directed flange opposite the lug on each plate, a pivotally supported dog in the casing to the rear of each flange, and which element is connected to the pivot of each dog and to the respective arms of the yoke, as and for the purpose set forth.

In testimony whereof I affix my signature.

JOSEPH H. JACOBS.